(12) United States Patent
Barsotti et al.

(10) Patent No.: US 6,221,494 B1
(45) Date of Patent: Apr. 24, 2001

(54) REACTIVE OLIGOMERS FOR ISOCYANATE COATINGS

(75) Inventors: Robert J. Barsotti, Franklinville; Patrick Henry Corcoran, Cherry Hill, both of NJ (US); Gary Delmar Jaycox, West Chester, PA (US); Laura Ann Lewin, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/272,718

(22) Filed: Mar. 18, 1999

(30) Foreign Application Priority Data

Nov. 3, 1998 (WO) .................................. PCT/US98/23337

(51) Int. Cl.$^7$ ................................................. C09D 175/06
(52) U.S. Cl. ..................................... 428/423.1; 427/385.5; 525/131; 525/440; 524/147; 524/153; 528/53; 528/58; 528/80
(58) Field of Search ..................................... 525/131, 440; 528/80, 53, 58; 428/423.1; 427/385.5; 524/147, 153

(56) References Cited

U.S. PATENT DOCUMENTS

| 4,376,187 | 3/1983 | Theodore et al. | 525/123 |
|---|---|---|---|
| 4,379,906 | 4/1983 | Chattha | 528/75 |
| 4,960,828 | 10/1990 | Higuchi et al. | 525/162 |
| 5,468,802 | 11/1995 | Wilt et al. | 524/539 |
| 5,852,162 | 12/1998 | Smith et al. | 528/272 |

FOREIGN PATENT DOCUMENTS

| 195 37 026 A1 | 4/1996 | (DE) . |
|---|---|---|
| 96/20968 * | 7/1996 | (WO) . |
| WO 96/20968 | 7/1996 | (WO) . |
| 97/44402 * | 11/1997 | (WO) . |
| WO 97/44402 | 11/1997 | (WO) . |

* cited by examiner

*Primary Examiner*—Patricia A. Short
(74) *Attorney, Agent, or Firm*—Sudhir G. Deshmukh

(57) ABSTRACT

The invention is directed to a two-pack solvent-based ambient curable coating composition comprising a binder of a hydroxyl and crosslinking components. The hydroxyl component includes a linear or branched cycloaliphatic moiety-containing reactive oligomer or blend of oligomers with a weight average molecular weight not exceeding 3,000, a polydispersity not exceeding about 1.7 with at least 2 hydroxyl groups, at least 1, on average, being a primary hydroxyl group. The reactive oligomer is formed by the reaction of an oligomeric acid with monofunctional epoxy. The crosslinking component includes one or more of an oligomeric crosslinker containing at least 2 isocyanate groups. The coating composition of the invention is particularly suited in automotive refinish coatings.

28 Claims, No Drawings

US 6,221,494 B1

REACTIVE OLIGOMERS FOR ISOCYANATE COATINGS

This invention generally relates to low VOC (volatile organic component) curable coating compositions used in automotive refinish applications and it more particularly relates two-pack reactive oligomer containing isocyanate coating compositions that cure under ambient conditions.

BACKGROUND OF THE INVENTION

A number of clear and pigmented coating compositions are utilized in various coatings, such as, for example, basecoats and clearcoats used in automotive refinish coatings, which are generally solvent based.

In repairing damage, such as dents to autobodies, the original coating in and around the damaged area is typically sanded or ground out by mechanical means. Some times the original coating is stripped off from a portion or off the entire autobody to expose the bare metal underneath. After repairing the damage, the repaired surface is coated, preferably with low VOC coating compositions, typically in portable or permanent low cost painting enclosures vented to atmosphere to remove the organic solvents from the freshly applied paint coatings in environmentally safe manner. Typically, the drying and curing of the freshly applied paint takes place within these enclosures. Furthermore, the foregoing drying and curing steps take place within the enclosure to also prevent the wet paint from collecting dirt in the air or other contaminants.

As these paint enclosures take up significant floor space of typical small autobody paint repair shops, these shops prefer to dry and cure these paints as fast as possible. More expensive enclosures are frequently provided with heat sources, such as conventional heat lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for low VOC fast curing coating formulations which cure under ambient conditions while still providing outstanding performance characteristics particularly mar-resistance and resistance to environmental etching.

One of the approaches used in addressing the foregoing involves utilizing a binder containing a linear or branched cycloaliphatic moiety-containing oligomer. However, these coating compositions disclosed in PCT Application U.S. 97/08179, cure at significantly high cure temperatures, in the range of from 120° C. to 150° C. Thus, a continuing need still exists for a low VOC coating composition that cures under ambient conditions.

STATEMENT OF THE INVENTION

This invention concerns an ambient curable coating composition comprising a binder, which comprises:

a hydroxyl component comprising a linear or branched cycloaliphatic moiety-containing reactive oligomer having a GPC weight average molecular weight not exceeding 3,000 and a polydispersity not exceeding about 1.7, said reactive oligomer having at least two hydroxyl groups, at least one of said hydroxyl groups on average being a primary hydroxyl group; and a crosslinking component comprising an oligomeric crosslinker provided with at least two isocyanate groups wherein the ratio of equivalents of isocyanate per equivalent of hydroxyl groups is in the range of from 0.5/1 to 3.0/1.

This invention further concerns a process for producing a coating on the surface of a substrate, said process comprising:

mixing hydroxyl and crosslinking components of a binder of an ambient coating composition to form a potmix, wherein said hydroxyl component comprises a linear or branched cycloaliphatic moiety-containing reactive oligomer having a GPC weight average molecular weight not exceeding 3,000 and a polydispersity not exceeding about 1.7, said reactive oligomer having at least two hydroxyl groups, at least one of which on average being a primary hydroxyl group, and wherein said crosslinking component comprising an oligomeric crosslinker provided with at least two isocyanate groups wherein the ratio of equivalents of isocyanate per equivalent of hydroxyl groups is in the range of from 0.5/1 to 3.0/1;

applying a layer of said pot mix on said surface; and curing said layer under ambient conditions to form said coating on said surface of said substrate.

DETAILED DESCRIPTION OF THE INVENTION

As used herein:

"Two-pack coating composition" means a thermoset coating composition comprising two components that are stored in separate containers, which are typically sealed for increasing the shelf life of the components of the coating composition. The components are mixed just prior to use to form a pot mix, which has a limited pot life, typically few minutes, such as 15 minutes to 45 minutes to few hours, such as 4 hours to 6 hours. The pot mix is applied as a layer of desired thickness on a substrate surface, such as an autobody. After application, the layer dries and cures to form a coating on the substrate surface having desired coating properties, such as, high gloss, mar-resistance and resistance to environmental etching.

"Low VOC coating composition" means a coating composition that includes less than 0.6 kilograms of organic solvent per liter (5 pounds per gallon) of the composition, as determined under the procedure provided in ASTM D3960.

"High solids composition" means a coating composition having solid component of above 40 percent, preferably in the range of from 45 to 85 percent and more preferably in the range of from 50 to 65 percent, all in weight percentages based on the total weight of the composition.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofuran and the standard was polymethyl methacrylate.

"Polydispersity" means GPC weight average molecular weight divided by GPC number average molecular weight.

"(Meth)acrylate" means acrylate and methacrylate.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series.

"Polymer solids" or "Binder solids" means a polymer or binder in its dry state.

The present invention is directed to a two-pack low VOC ambient curable coating composition that is particularly suited for use in automotive refinishing process. The composition includes a binder in an organic solvent. The amount organic solvent used results in the composition having VOC of less than 0.6 kilograms (5 pounds per gallon) and preferably in the range of 0.25 kilograms to 0.53 kilograms (2.1 pounds to 4.4 pounds per gallon) of organic solvent per liter of the composition.

The binder includes a hydroxyl and a crosslinking component. The hydroxyl component includes in the range of from 2 weight percent to 100 weight percent, preferably in the range of from 10 weight percent to 90 weight percent, more preferably in the range of from 20 weight percent to 80 weight percent and most preferably in the range of from 30 weight percent to 50 weight percent of a linear or branched cycloaliphatic moiety-containing reactive oligomer or a blend of such oligomers. The reactive oligomer is provided with a GPC weight average molecular weight not exceeding about 3000, preferably in the range of from 300 to 2000, more preferably in the range of from 500 to 1200. Applicants have discovered that if the molecular weight of the reactive oligomer exceeds 3000, the reactive oligomer becomes too viscous. As a result, larger amount of solvent is needed to produce a coating composition that can be sprayed by conventional spray coating devices. However, such a coating composition will not be a low VOC coating composition. The polydispersity of the reactive oligomer of the present invention does not exceed about 1.7. Preferably, the polydispersity is in the range of from 1.01 to 1.5, more preferably in the range of from 1.01 to 1.3. Applicants have discovered that if the polydispersity of the reactive oligomer exceeds 1.7, a coating composition which includes such a reactive oligomer will produce coating compositions too viscous for conventional spray coating devices and such compositions will have poor pot life.

Applicants have unexpectedly discovered that the presence of cycloaliphatic moiety in the reactive oligomer is critical for solubilizing of the reactive oligomer in a variety of organic solvents described below. The presence of cycloaliphatic moiety also improves the miscibility of the multiple components of a coating composition and help maintain the film hardness of a coating resulting therefrom under normal use.

The reactive oligomer is provided on an average in the range of from 2 to 10, preferably in the range of from 2 to 6 and more preferably in the range of from 2 to 4 with hydroxyl groups. Of these hydroxyl groups, on an average at least one, preferably in the range of 1 to 4, more preferably in the range of from 2 to 4 must be primary hydroxyl groups. The foregoing average range may be attained by blending reactive oligomers having various number of primary hydroxyl groups. The primary hydroxyl group is a hydroxyl group positioned at the terminal end of the reactive oligomer. Applicants have made an unexpected discovery that when a low VOC high solids coating composition includes a reactive oligomer with at least one primary hydroxyl group, a coating from such a coating composition cures readily under ambient conditions. It is believed that the reactive oligomers of the present invention derive their a high degree of reactivity from (a) the primary hydroxyl groups as opposed to the more common secondary hydroxyls, (b) the narrow polydispersity, and (c) by ensuring that hydroxyl functionalities are uniformly distributed on each oligomeric chain of the reactive oligomer.

The reactive oligomer of the present invention is produced by first reacting a multifunctional alcohol, such as, pentaerythritol, hexandiol, trimethylol propane with alicyclic monomeric anhydrides, for example, hexahydrophthalic anhydride or methylhexahydrophthalic anhydride to produce an oligomeric acid. Mixtures of the foregoing anhydrides may also be used. Non-alicyclic anhrydides (linear or aromatic), for example, succinic anhydride or phthalic anhydride could also be added to the alicyclic monomeric anhydrides. Oligomeric acids having at least one hydroxyl functionality are also suitable, prepared by reacting the multifunctional alcohol with less than a stochiometric amount of the monomeric anhydride.

The oligomeric acid is then reacted with a monofunctional epoxy, at a reaction gage pressure of less than 14 kg/cm$^2$ (200 psig), preferably at the reaction gage pressure in the range of from 0 kg/cm$^2$ to 2.1 kg/cm$^2$ (0 to 30 psig) to produce the reactive oligomer. The oligomerization is generally carried out at a reaction temperature in the range of from 60° C. to 200° C., preferably in the range of from 80° C. to 170° C., and more preferably in the range of from 90° C. to 150° C. Typical reaction time is in the range of from 1 hours to 24 hours, preferably 1 hour to 4 hours.

The foregoing two-step process ensures that the hydroxyl functionalities are uniformly distributed on each oligomeric chain of the reactive oligomer the reactive oligomers are provided with the polydispersity in the range described earlier.

The monofunctional epoxy suitable for use in the present invention include alkylene oxide of 2 to 12 carbon atoms, ethylene, propylene and butylene oxides are preferred, ethylene oxide is more preferred. Other epoxies, such as, Cardura® E-10 glycidyl ester, supplied by Exxon Chemicals, Houston, Tex. may be used in conjunction with the monofunctional epoxies, described above.

It should be understood that in generating the primary hydroxyl functionalities the foregoing reaction results in a blend of primary hydroxyl functionalities, such that the reactive oligomers are provided with varying number of primary hydroxyl functionalities, i.e., some of the oligomers may have more or less primary hydroxyl functionalities. So long as the average number of primary hydroxyl functionalities on the reactive oligomer fall with in the range described earlier, the inclusion of the reactive oligomer of the present invention in a coating composition results in a low VOC high solids coating composition that cures under ambient conditions.

The hydroxyl component of the binder of the present invention may be blended with non-alicyclic (linear or aromatic) oligomers, if desired. Such non-alicyclic-oligomers may be made by the aforedescribed process by using non-alicyclic anhydrides, such as succinic or phthalic anhydrides, or mixtures thereof. Caprolactone oligomers described in the U.S. Pat. No. 5,286,782 may be also used.

The hydroxyl component of the binder of the present invention may further include in the range of from 0.1 percent to 95 percent, preferably in the range of from 10 percent to 90 percent, more preferably in the range of from 20 percent to 80 percent and most preferably in the range of from 50 percent to 70 percent, all based on the total weight of the hydroxyl component of an acrylic polymer, a polyester or a combination thereof. Applicants have discovered that by adding one or more the foregoing polymers to the hydroxyl component, the two-pack coating composition resulting therefrom provides coating with improved appearance, sag resistance, and flow and leveling properties.

The acrylic polymer has a GPC weight average molecular weight exceeding 3000, preferably in the range of from 3000 to 20,000, more preferably in the range of 6000 to 20,000, and most preferably in the range of from 8000 to 12,000. The Tg of the acrylic polymer varies in the range of from 0° C. to 100° C., preferably in the range of from 30° C. to 80° C.

The acrylic polymer suitable for use in the present invention may be any conventional solvent soluble acrylic polymer conventionally polymerized from typical monomers, such as alkyl (meth)acrylates having alkyl carbon atoms in the range of from 1 to 18, preferably in the range of from 1 to 12 and styrene and functional monomers, such as, hydroxy ethyl acrylate and hydroxy ethyl methacrylate.

In addition to the forgoing polymers, the hydroxyl component of the binder of the present invention may further contain up to 40 percent, preferably in the range of from 5 to 35, more preferably in the range of from 20 to 30, all in weight percent based on the total weight of the binder of a dispersed acrylic polymer which is a polymer particle dispersed in an organic media, wherein the polymer particle is emulsion stabilized by what is known as steric stabilization. Preferably, the polymer particle is provided with a core having macromonomer chains or arms attached to it. The preferred average particle size of the core is in the range of from 0.1 to 0.5 microns, preferably in the range of from 0.15 to 0.4, more preferably in the range of from 0.15 to 0.35.

The dispersed acrylic polymer includes in the range of from about 10 percent to 90 percent, preferably in the range of from 50 percent to 80 percent all in weight percent based on the weight of the dispersed polymer, of a core formed from high molecular weight polymer having a weight average molecular weight of about 50,000 to 500,000, preferably in the range of from 50,000 to 200,000, more preferably in the range of from 50,000 to 150,000. The arms make up about 10 percent to 90 percent, preferably 10 percent to 59 percent, all in weight percent based on the weight of the dispersed polymer. The arms are formed from a low molecular weight polymer having weight average molecular weight of in the range of from about 1,000 to 30,000, preferably in the range of from 3000 to 20,000, more preferably in the range of from 3000 to 15,000.

The core of the dispersed acrylic polymer is comprised of polymerized acrylic monomer(s) optionally copolymerized with ethylenically unsaturated monomer(s). Suitable monomers include styrene, alkyl (meth)acrylate having alkyl carbon atoms in the range of from 1 to 18, preferably in the range of from 1 to 12; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described above.

The polyester has a GPC weight average molecular weight exceeding 1500, preferably in the range of from 1500 to 100,000, more preferably in the range of 2000 to 50,000, still more preferably in the range of 2000 to 8000 and most preferably in the range of from 2000 to 5000. The Tg of the polyester varies in the range of from −50° C. to +100° C., preferably in the range of from −20° C. to +50° C.

The polyester suitable for use in the present invention may be any conventional solvent soluble polyester conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the persent invention are further provided in the U.S. Pat. No. 5,326,820, which is incorporated herein by reference. One of the commercially available polyester, which is particularly preferred, is SCD®-1040 polyester, which is supplied by Etna Product Inc., Chagrin Falls, Ohio.

In the absence of the aforedescribed acrylic polymer or polyester in the hydroxyl component or when low levels of less than 20 weight percent of the aforedescribed acrylic polymer or polyester is present in the hydroxyl component, the reactive oligomers having three or more hydroxyl functionalities are most preferred. At higher levels of the aforedescribed acrylic polymer or polyester in the hydroxyl component, the need for the reactive oligomers having three or more hydroxyl functionalities is not as important to get good film properties. In the later coating systems, the reactive oligomers having two hydroxyl functionalities can employed to good advantage.

The crosslinking component of the binder is stored separately from the hydroxyl component prior to application. The crosslinking component includes an oligomeric crosslinker or a blend thereof. The crosslinker is provided with at least two isocyanate groups, such that the ratio of equivalents of isocyanate of the oligomeric crosslinker per equivalent of the hydroxyl of the hydroxyl component is in the range of from 0.5/1 to 3.0/1, preferably in the range of from 0.7/1 to 1.8/1, more preferably in the range of from 0.8/1 to 1.3/1. Some of suitable oligomeric crosslinkers include aromatic, aliphatic, or cycloaliphatic isocyanates, trifunctional isocyanates and isocyanate functional adducts of a polyol and difunctional isocyanates. Some of the particular isocyanates include diisocyanates such as 1,6-hexamethylene diisocyanate, isophorone diisocyanate, 4,4'- biphenylene diisocyanate, toluene diisocyanate, biscyclohexyl diisocyanate, tetramethylene xylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Some of the suitable trifunctional isocyanates include triphenylmethane triisocyanate, 1,3,5-benzene triisocyanate, and 2,4,6-toluene triisocyanate. Trimers of diisocyanate, such as the trimer of hexamethylene diisocyante sold under the trademark Desmodur®N-3390 by Bayer Corporation of Pittsburgh, Pa. and the trimer of isophorone diisocyanate are also suitable. Furthermore, trifunctional adducts of triols and diisocyanates are also suitable. Trimers of diisocyanates are preferred and trimers of isophorone and hexamethylene diisocyantes are more preferred.

The crosslinking component may optionally include in the range of from 0.1 percent to 30 percent, preferably in the range of from 5 percent to 25 percent, more preferably in the range of from 10 percent to 20 percent, all in weight percentages based on the total weight of binder solids, additional crosslinkers, such as aldimine oligomers which are the reaction products of alkyl aldehydes, such as, isobutyraldehyde with diamines, such as isophorone diamine. Ketimine oligomers which are the reaction product of alkyl ketones, such as, methyl isobutyl ketone with diamines, such as, 2-methyl pentamethylene diamine. Polyaspartic esters, which are the reaction product of diamines, such as, isopherone diamine with dialkyl maleates, such as, diethyl maleate. All of the foregoing additional crosslinkers are well known, such as those supplied under the trademark Desmophen® amine co-reactants by Bayer Corporation, Pittsburgh, Pa.

The crosslinking component of the binder preferably includes a catalytic amount of a catalyst for accelerating the curing process. The catalytic amount depoends upon the reactivity of the primary hydroxyl group of the reactive olgomer present in the hydroxyl component of the binder. Generally, in the range of about 0.001 percent to about 5 percent, preferably in the range of from 0.01 percent to 2 percent, more preferably in the range of from 0.02 percent to 1 percent, all in weight percent based on the total weight of binder solids of the catalyst is utilized. A wide variety of catalysts can be used, such as, tin compounds, including dibutyl tin dilaurate; tertiary amines, such as, triethylenediamine. These catalysts can be used alone or in conjunction with carboxylic acids, such as, acetic acid. One of the commercially available catalyst sold under the trademark, Fastcat® 4202 dibutyl tin dilaurate by Elf-Atochem North America, Inc. Philadelphia, Pa., which is particularly suitable.

The hydroxyl or crosslinking component of the binder of the coating composition of the present invention, which is formulated into high solids coating systems further contains at least one organic solvent which is typically selected from the group consisting of aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters. such as propylene glycol monomethyl ether acetate. The amount of organic solvent added depends upon the desired solids level as well as the desired amount of VOC of the composition. If desired, the organic solvent may be added to both components of the binder.

The coating composition of the present invention may also contain conventional additives, such as, pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating. The foregoing additives may be added to either the hydroxyl or crosslinking components, or both, depending upon the intended use of the coating composition. These additives are preferably added to the hydroxyl component.

The hydroxyl and crosslinking components are mixed just prior to use or about 5 to 30 minutes before use to form a pot mix, which has limited pot life. A layer of the pot mix is typically applied to a substrate by conventional techniques, such as, spraying, electrostatic spraying, roller coating, dipping or brushing. The layer of the coating composition then cures under ambient conditions in the range of 30 minutes to 24 hours, preferably in the range of 30 minutes to 3 hours to form a coating on the substrate having the desired coating properties. It is understood that the actual curing time depends upon the thickness of the applied layer and on any additional mechanical aids, such as, fans that assist in continuously flowing air over the coated substrate to accelerate the cure rate. If desired, the cure rate may be further accelerated by baking the coated substrate at temperatures generally in the range of from about 60° C. to 150° C. for a period of about 15 to 90 minutes. The foregoing baking step is particularly useful under OEM (Original Equipment Manufacture) conditions.

If desired, the APHA color values of the coating composition, when used as a clear coating composition, may be lowered in the range of 0 to 80, preferably in the range of from 0 to 50 by adding, in the range of from 0.1 weight percent to 3 weight percent, preferably in the range of from 0.4 weight percent to 1 weight percent all in percentages based on reactive oligomer solids, a phosphite compound to the coating composition. Some of the suitable phosphite compounds include 9,10-dihdydro-9-oxa-10-phosphaphenanthrene and triphenyl phosphite, of which 9,10-dihdydro-9-oxa-10-phosphaphenanthrene is preferred.

The present formulations are particularly useful as a clear coating for outdoor articles, such as automobile and other vehicle body parts. The substrate is generally prepared with a primer and or a color coat or other surface preparation prior to coating with the present compositions.

EXAMPLES

Test Procedures

The following test methods were used:

Gardner-Holdt Viscosity was measured under ASTM test D1545.

The Zahn 2 viscosity in seconds was measured using the Zahn 2 cup. The dry time of a coated layer of the composition was measured as BK3 surface dry time under ASTM D5895.

The gel fraction of free test films (removed from TPO) was determined in boiling acetone. Approximately 0.5 grams of the test film was placed on a wire mesh screen. The screen containing the film was placed in acetone bath, boiled for 6 hours and then allowed to cool. The screen was removed from the acetone bath, dried overnight and then re-weighed. The reading was reported as:

Percent gel fraction=100×(weight of film after boiling/weight of film before boiling).

Thus. a percent gel fraction reading of 100 indicates complete crosslinking, i.e., none of the test film dissolved in acetone and a reading of 0 indicates that no crosslinking took place, i.e., all of the test film dissolved in acetone.

Etch Resistance was measured by exposing coated test panels at a test facility in Jacksonville, Fla. for 14 weeks during the summer. Comparisons were made to standard melamine coated panels. A visual scale of 1 to 12 was used to determine etch resistance, with 12 being worst (melamine coatings are typically rated at 10 to 12) and 1 being the best.

Procedure 1

Comparative Tetra Hydroxyl Functional Oligomer

Preparation of Acid Oligomer

To a 12-liter flask fitted with an agitator, condenser, heating mantle, nitrogen inlet, thermocouple and an addition port, 2447.2 g of propylene glycol monomethylether acetate, 792.4 g of pentaerythritol and 1.36 g of triethylamine was added. The reaction mixture was agitated and heated under a nitrogen blanket to 140° C. and 3759 g of Milldride®methyl hexahydrophthalic anhydride(MHHPA) supplied by Milliken Chemical Company, Spartanburg, S.C. was then added over 6 hrs. The reaction mixture was then held at 140° C. until no anhydride bands were observed on an infrared spectroscopic trace.

Preparation of Tetra-Hydroxy Functional Oligomer

To a 5-liter flask fitted with an agitator, condenser, heating mantle, nitrogen inlet, thermocouple and an addition port, 2798.4 g of acid oligomer prepared in Example 1 and 2.76 g of triethylamine were added. The mixture was agitated and heated to 60° C. under nitrogen. Then, 696.9 g of 1,2-epoxy butane was added over 120 mins, after which the temperature was raised to 105° C. and held at that temperature until the acid number dropped to about 10 or less. The resulting comparative oligomer had percent weight solids @ 71.5, Gardner viscosity V, GPC number average molecular weight 895 and GPC weight average molecular weight of 1022 as determined by using polystyrene as a standard.

Procedure 2

Pentaerythritol Based Hydroxy Reactive Oligomer

The following ingredients in grams were charged to a vessel rated for high pressure and heated to 140° C.

| propylene glycol monomethyl ether acetate | 565 |
|---|---|
| pentaerythritol | 136 |
| triethylamine | 0.23 |

To the vessel, 645.12 grams of Milldride®methyl hexahydrophthalic anhydride supplied by Milliken Chemical Company, Spartanburg, S.C. was then added over one hour. The batch was then held at 140° C. for 6 hours. The batch was then cooled to 25° C., the pressure vessel was then sealed and 260.4 g of ethylene oxide, supplied by M. G. Industries, Malvern, Pa., was added and the batch was heated to 110° C. and held at 110° C. for 6 hours. Excess ethylene oxide was removed by purging the batch with nitrogen. The acid number on solids was tested at less that 10 mg KOH/gram. The resulting reactive oligomer at 64.8 percent solids had all primary hydroxyl functionalities. The Gardner-Holdt viscosity of the resulting oligomer was H+1/4.

Procedure 3

Pentaerythritol Based Hydroxy Oligomer

The following ingredients in grams were charged to a vessel rated for high pressure and heated to 140° C.

| propylene glycol monomethyl ether acetate | 420 |
|---|---|
| pentaerythritol | 136 |
| triethylamine | 0.23 |

To the vessel, 645.12 grams of Milldride®methyl hexahydrophthalic anhydride(MHHPA) supplied by Milliken Chemical Company, Spartanburg, S.C. was then added over one hour. The batch was then held at 140° C. for 6 hours. The batch was then cooled to 25° C., the pressure vessel was then sealed and 173.57 g of ethylene oxide, supplied by M. G. Industries, Malvern, Pa. was added and the batch was then heated to 110° C. and held at 110° C. for 6 hours. Excess ethylene oxide was removed by purging the batch with nitrogen. The acid number on solids was tested at 35 mg KOH/gram. To the batch, 143.1 grams of Glydexx-N10® glycidyl ester of branched C-10 acid supplied Exxon Chemicals, Houston, Tex. was added and the batch was heated to 130° C. and held until an acid number less than 5 was measured. The batch was cooled and filled out. The resulting reactive oligomer had about 90 percent primary hydroxyl and about 10 percent secondary hydroxyl functionalities. The solids percentage was measured at 74.8 and the Gardner-Holdt viscosity was V+3/4.

Procedure 4

Comparative Di-Hydroxyl Functional Oligomer

Preparation of Acid Oligomer

To a 12-liter flask fitted with an agitator, condenser, heating mantle, nitrogen inlet, thermocouple and an addition port 2434.5 g of propylene glycol monomethylether acetate, 1222.5 g of hexane diol and 1.37 g of triethylamine were added. The reaction mixture was agitated and heated to 140° C. under a nitrogen blanket at which time 3341.6 g of Milldride®methyl hexahydrophthalic anhydride supplied by Milliken Chemical Company, Spartanburg, S.C. was added over 6 hrs. The reaction mixture was then held at 140° C. until no anhydride bands were observed on an infrared spectroscopic trace.

Preparation of Oligomeric Diol

To a 5-liter flask fitted with an agitator, condenser, heating mantle, nitrogen inlet, thermocouple and an addition port 2020.4 g of acid oligomer prepared above and 2.45 g of triethylamine were added. The mixture was agitated and heated to 60° C. under nitrogen. Then, 478.3 g of 1,2-epoxy butane was added over 2 hours, after which the temperature was raised to 105° C. and held at that temperature until the acid number dropped to about 10 or less. The resulting comparative di-hydroxy ologmer having all secondary hydroxyl functionalities had solids at 69.5 weight percent, Gardner viscosity A, number average molecular weight 679 and weight average molecular weight 770 as determined by GPC using polystyrene as a standard.

Procedure 5

Hexanediol Based Hydroxy Oligomer

The following ingredients in grams were charged to a vessel rated for high pressure and heated to 140° C.

| propylene glycol monomethyl ether acetate | 396 |
|---|---|
| hexanediol | 118 |
| triethylamine | 0.13 |

To the vessel, 322.56 grams of Milldride®methyl hexahydrophthalic anhydride(MHHPA) supplied by Milliken Chemical Company, Spartanburg, S.C. was then added over one hour. The batch was then held at 140° C. for 6 hours. The batch was then cooled to 25° C., the pressure vessel was then sealed and 130.17 g of ethylene oxide, supplied by M. G. Industries, Malvern, Pa. was added and the batch was then heated to 110° C. and held at 110° C. for 6 hours. Excess ethylene oxide was removed by purging the batch with nitrogen. The acid number on solids was tested at less that 7.3 mg KOH/gram. The batch was cooled and filled out. The resulting reactive oligomer had about 100 percent primary hydroxyl functionalities. The solids percentage was measured at 59.83 and the Gardner-Holdt viscosity was A2.

Procedure 6

Hexanediol Based Hydroxy Oligomer

The following ingredients in grams were charged to a vessel rated for high pressure and heated to 140° C.

| propylene glycol monomethyl ether acetate | 235 |
|---|---|
| hexanediol | 118 |
| triethylamine | 0.13 |

To the vessel, 322.56 grams of Milldride®methyl hexahydrophthalic anhydride(MHHPA) supplied by Milliken Chemical Company, Spartanburg, S.C. was then added over one hour. The batch was then held at 140° C. for 6 hours. The batch was then cooled to 25° C., the pressure vessel was then sealed and 86.78 g of ethylene oxide, supplied by M. G. Industries, Malvern, Pa. was added and the batch was then heated to 110° C. and held at 110° C. for 6 hours. Excess ethylene oxide was removed by purging the batch with nitrogen. The acid number on solids was tested at less that 38 mg KOH/gram. To the batch, 89.0 grams of Glydexx-N10® glycidyl ester of branched C-10 acid supplied by Exxon Chemicals, Houston, Tex. was added and the batch was heated to 130° C. and held until an acid number less than 5 was measured. The batch was cooled and filled out. The resulting reactive oligomer had about 90 percent primary hydroxyl and about 10 percent secondary hydroxyl functionalities. The solids percentage was measured at 76.07 and the Gardner-Holdt viscosity was D+1/2.

Procedure 7

Hydrogenated BisPhenol a Based Hydroxy Oligomer

The following ingredients in grams were charged to a vessel rated for high pressure and heated to 140° C.

| propylene glycol monomethyl ether acetate | 302.92 |
|---|---|
| hydrogenated bisphenolA | 240 |
| triethylamine | 0.17 |

To the vessel, 322.56 grams of Milldride®methyl hexahydrophthalic anhydride(MHHPA) supplied by Milliken Chemical Company, Spartanburg, S.C. was then added over one hour. The batch was then held at 140° C. for 6 hours. The batch was then cooled to 25° C., the pressure vessel was then sealed and 86.78 g of ethylene oxide, supplied by M. G. Industries, Malvern, Pa. was added and the batch was then heated to 110° C. and held at 110° C. for 6 hours. Excess ethylene oxide was removed by purging the batch with nitrogen. The acid number on solids was tested at 40 mg KOH/gram. To the batch, 123.31 grams of Glydexx-N10® glycidyl ester of branched C-10 acid supplied by Exxon Chemicals, Houston, Tex. was added and the batch was heated to 130° C. and held until an acid number less than 5 was measured. The batch was cooled and filled out. The resulting reactive oligomer had about 90 percent primary hydroxyl and about 10 percent secondary hydroxyl functionalities. The solids percentage was measured at 74.5 and the Gardner-Holdt viscosity was V+1/2.

Procedure 8

Cyclohexandedimethylol Based Hydroxy Oligomer

The following ingredients in grams were charged to a vessel rated for high pressure and heated to 140° C.

| propylene glycol monomethyl ether acetate | 250 |
|---|---|
| cyclohexanedimethylol | 144 |
| triethylamine | 0.14 |

To the vessel, 322.56 grams of Milldride®methyl hexahydrophthalic anhydride(MHHPA) supplied by Milliken Chemical Company, Spartanburg, S.C. was then added over one hour. The batch was then held at 140° C. for 6 hours. The batch was then cooled to 25° C., the pressure vessel was then sealed and 86.78 g of ethylene oxide, supplied by M. G. Industries, Malvern, Pa. was added and the batch was then heated to 110° C. and held at 110° C. for 6 hours. Excess ethylene oxide was removed by purging the batch with nitrogen. The acid number on solids was tested at 26 mg KOH/gram. To the batch, 66.9 grams of Glydexx-N10® glycidyl ester of branched C-10 acid supplied by Exxon Chemicals, Houston, Tex. was added and the batch was heated to 130° C. and held until an acid number less than 5 was measured. The batch was cooled and filled out. The resulting reactive oligomer had about 90 percent primary hydroxyl and about 10 percent secondary hydroxyl functionalities. The solids percentage was measured at 72.46 and the Gardner-Holdt viscosity was E+1/2.

Procedure 9

Acrylic Polymer

The process steps shown in Table 1 were used to an acrylic polymer having 58.5 percent to 60.5 percent solids with Gardner-Holdt viscosity of S to V:

TABLE 1

| Steps | Ingredient | Amount in Grams |
|---|---|---|
| Step 1 | | |
| | Xylene[1] | 160.77 |
| Step 2 | | |
| | Styrene[2] | 73.44 |
| | Hydroxyethyl methacrylate | 122.44 |
| | isoborn methacrylate | 73.44 |
| | methyl methacrylate | 9.79 |
| | 2-ethylhexyl methacrylate | 122.65 |
| | isobutyl methacrylate | 97.94 |
| | xylene | 13.7 |
| Step 3 | xylene[3] | 10.26 |
| Step 4 | | |
| | t-butyl peroxyacetate[4] | 18.96 |
| | xylene | 45.66 |
| Step 5 | | |
| | xylene[5] | 5.71 |
| Step 6 | | |
| | T-butyl peroxyacetate[6] | 3.29 |
| | methyl ethyl ketone | 41.24 |

TABLE 1-continued

| Steps | Ingredient | Amount in Grams |
|---|---|---|
| Step 7 | | |
| | methyl ethyl ketone[7] | 3.982 |
| | xylene | 19.865 |
| | xylene | 10.135 |
| | methyl ethyl ketone | 1.728 |
| | | 825.000 |

Steps associated with the addition of ingredients:

1 To reactor through dip tube. Heated to reflux at 135° to 142° C. Maintained reflux during feeds and hold period.

2 Added and mixed for 10 minutes. Fed to reactor via gooseneck over 180 minutes simultaneously with Step 4 below.

3 Rinsed and flushed to reactor.

4 Added and mixed for 10 minutes. Fed simultaneously with Step 2 over 180 minutes. Held at reflux 15 minutes.

5 Rinsed and flushed to reactor.

6 Added and mixed for 10 minutes. Began feeding after completion of 15 minute hold period in Step 4. Fed over 30 minutes at reflux (120° to 125° C.). Held for 30 min at reflux.

7 Rinsed and flushed to reactor.

Procedure 10

Pentaerythritol/methyl Hexahydrophthalic Anhydride/Butylene Oxide Oligomer

Into a dry, 1-liter 4-neck flask, fitted with a dry ice condenser, agitator, thermometer and nitrogen inlet, rapidly charge all of the ingredients listed below were rapidly added:

| Pentaerythritol | 97.9 gm. | (0.72 moles) |
|---|---|---|
| 9,10-dihydro-9-oxa-10-phosphaphenanthrene-10-oxide* | 2.80 gm. | (0.013 mole) |
| MHHPA** | 353.8 gm. | (2.16 mole) |
| Tetraethylammonium Bromide | 2.27 gm. | (0.018 mole) |
| 2-Heptanone*** | 153.0 gm | |

* supplied by Sanko Japan
**Milldride ® methyl hexahydrophthalic anhydride supplied by Milliken Chemical Company. Spartanburg, South Carolina
***Solvent amount adjusted to produce 80% solids The flask was swept with nitrogen and a nitrogen atmosphere at all times was maintained through out the process. The reaction mixture was heated to 145° C., held at 140–145° C. for 2 hours, cooled to 135° C. and then with rapid agitation, 155.5 gm. (2.16 mole) of 1,2-Butylene Oxide was added dropwise at a rate slow enough that no more than a slight reflux was observed in the dry ice condenser, the feed lasting for about 2.5 hours. The reaction was maintained at 135° C. for the next two hours until an acid number of 2 was obtained an then reaction was cooled. The resulting reactive oligomer had 25 percent primary and 75 percent secondary hydroxyl functionalities, solids at 81.07 percent and Gardner-Holdt viscosity at Z1. The color of the reactive oligomer was significantly lower than conventional reactive oligomers with APHA color of 25, under the ASTM D 1209-62. The APHA reading of conventional oligomers is typically over 100.

As shown in Table 2 below, a Comparative 1, Examples 1 through 3 were prepared by utilizing the various reactive oligomers prepared in accordance with various procedures described earlier:

TABLE 2

| | Comparative 1 in grams | Example 1 in grams | Example 2 in grams | Example 3 in grams |
|---|---|---|---|---|
| Hydroxyl Component | | | | |
| Oligomer of Procedure 1 | 17.03 | | | |
| Oligomer of Procedure 2 | | 17.25 | | |
| Oligomer of Procedure 3 | | | 15.0 | |
| Oligomer of Procedure 10 | | | | 21.06 |
| butyl acetate | 3.2 | 2.8 | 5.1 | 11.61 |
| Flow Additive* | 0.2 | 0.2 | 0.2 | 0.32 |
| Catalyst** | 0.4 | 0.4 | 0.4 | 0.65 |
| Crosslinking Component*** | 8.57 | 8.78 | 7.84 | 15.38 |

*10% BYK 301 ® flow additive in Propylene glycol monomethyl ether acetate supplied by BYK-CHEMIE, Wallingford, Connecticut.
**1% Di butyl tin dilaurate in methyl ethyl ketone supplied by Elf-Atochem North America, Inc. Philadelphia, Pennsylvania.
***Tolonate ®HDT-LV Isocyanurate trimer of hexamethylene diisocyanate supplied by RHODIA INC., Cranbury, New Jersey.

The foregoing Examples 1 through 3 represent coating compositions containing low molecular weight tetra hydroxyl functional reactive oligomers, which are crosslinked by an isocyanate crosslinker. Examples 1 through 3 all were prepared at a stoichiometry of (NCO/OH) of 1.05/1.0 with the level of catalyst at 200 parts per million (PPM) based on the binder. The Comparative 1 utilized an oligomer with all secondary hydroxyl groups, Example 1 had all primary hydroxyl groups, Example 2 had about a 90/10 ratio of primary to secondary hydroxyl groups, and Example 3 had about a 25/75 ratio of primary to secondary hydroxyl groups.

The reaction rate under ambient conditions (24° C. (75° F.) @ 50% relative humidity) of Comparative 1 and Examples 1 through 3 were measured using Infrared (IR) cure studies. The consumption of isocyanate versus time was measured. A reading 100 would equal complete isocyanate (NCO) consumption and a reading of 0 would equal no NCO consumption. Thus, the higher the reading, the greater the cure under the ambient reaction conditions. The NCO consumption results are shown in Tables 3 and 4 below:

TABLE 3

| 4 hrs. @ Room Temp | |
|---|---|
| Comparative 1 (all secondary OH functionalities) | 11.67 |
| Example 1 (all primary OH) | 28.39 |
| Example 2 (primary/secondary OH @ 90/10) | 35.29 |
| Example 3 (primary/secondary OH @ 25/75) | 36.77 |

The above-described compositions were remade at a higher catalyst level of 500 PPM of di butyl tin dilaurate as Comparative 2 and Examples 4, 5 and 6. The IR cure studies show the percent NCO consumed:

TABLE 4

| 4 hrs. @ Room Temp | |
|---|---|
| Comparative 2 (500 PPM) | 30.21 |
| Example 4 (500 PPM) | 47.79 |
| Example 5 (500 PPM) | 49.38 |

TABLE 4-continued

| | |
|---|---|
| 4 hrs. @ Room Temp | |
| Example 6 (500 PPM) | 52.03 |

The higher reactivity of Example 1 through 6 having more reactive primary hydroxyl groups results in coating compositions that cure rapidly under ambient conditions. By contrast the oligomers of Comparatives 1 and 2 with secondary hydroxyl groups cure too slowly for use any ambient curable coating compositions.

Comparative 2, Example 4 and Example 6 were drawn-down over glass and tested for dry time using a BK dry time tester. The "surface dry (BK 3 time)" for Comparative 2 (secondary hydroxyl functionalities) was 554 minutes, for Example 4 (primary hydroxyl functionalities) it was 288 minutes and for Example 6 it was 350 minutes. This is a significant improvement in curing time which enables the use of such reactive oligomers in ambient curable coating composition that are particularly suited for refinish automotive applications.

The coatings (dry film thickness of 50 microns (2 mils)) of Examples 4 and 5 were cast over a black waterborne basecoat previously exposed to a warm air flash of 5 minutes at 82° C. (180° F.). The coatings were cured for 30 minutes at 141° C. (285° F.). These coatings exhibited excellent cure (greater than 90 percent NCO consumption), hardness (greater than 130 Newtons per square millimeters, as measured by using a Fischerscope Hardness Tester Model No. HM100V), and etch resistance (6 to 7 rating).

As shown in Table 5 below, a Comparative 3, Examples 6 and 7 were prepared by utilizing the various reactive oligomers prepared in accordance with various procedures described earlier:

TABLE 5

| | Comparative 3 in grams | Example 6 in grams | Example 7 in grams |
|---|---|---|---|
| Hydroxyl Component | | | |
| Oligomer of Procedure 4 | 17.8 | | |
| Oligomer of Procedure 5 | | 18.5 | |
| Oligomer of Procedure 6 | | | 15.0 |
| butyl acetate | 3.0 | 2.5 | 5.1 |
| Flow Additive* | 0.2 | 0.2 | 0.2 |
| Catalyst** | 0.4 | 0.38 | 0.37 |
| Crosslinking Component*** | 8.03 | 7.88 | 7.18 |

*10% BYK 301 ® flow additive in Propylene glycol monomethyl ether acetate, supplied by BYK-CHEMIE, Wallingford, Connecticut.
**1% Di butyl tin dilaurate in methyl ethyl ketone supplied by Elf-Atochem North America, Inc. Philadelphia, Pennsylvania.
***Tolonate ® HDT-LV Isocyanurate trimer of hexamethylene diisocyanate supplied by RHODIA INC., Cranbury, New Jersey.

The foregoing coating compositions in Table 5 contained low molecular weight dihydroxyl functional oligomers crosslinked by isocyanate, wherein the stoichiometric ratio of NCO to OH was 1.05 to 1.0 and the level of catalyst was at 200 parts per million (PPM) based on the binder solids. Comparative 3 utilized an oligomer with all secondary hydroxyl groups, Example 6 had all primary hydroxyl groups and Example 7 had about a 90/10 ratio of primary to secondary hydroxyl groups.

The reaction rate under ambient conditions (24° C. (75° F.) @ 50% relative humidity) of Comparative 3 and Examples 6 and 7 were measured using Infrared (IR) cure studies. The NCO consumption results are shown in Tables 6 below:

TABLE 6

| | |
|---|---|
| 4 hrs. @ Room Temp | |
| Comparative 3 (secondary OH) | 43.05 |
| Example 6 (primmary OH) | 54.61 |
| Example 7 (primary / sec 90/10) | 52.88 |

Coatings from the pot mix of the following two-pack composition, shown in Table 7, were cast at approximately 50 microns (2 mils) dry film thickness on glass and cured at room temperature.

TABLE 7

| | Example 8 |
|---|---|
| Acrylic Polymer (Procedure 9) | 64.45 |
| Hydroxyl Component | |
| CHDM/MHHPA/EO (Procedure 8) | 20.25 |
| Butyl Acetate | 26.54 |
| TINUVIN ® 384, UV Screener from CIBA SPECIALTY CHEMICAL CORP., Tarrytown, New York | 2.64 |
| BYK306 Flow Additive from BYK-CHEMIE, Wallingford, Connecticut | 0.33 |
| TINUVIN ® 292 Light Stabilizer from CIBA SPECIALTY CHEMICAL CORP., Tarrytown, New York | 1.67 |
| 1% Dibutyltin Dilaurate in Methyl Ethyl Ketone | 1.67 |
| Crosslinking Component | |
| TOLONATE ® HDT-LV Isocyanate Trimer from RHODIA INC., Cranbury, New Jersey | 23.99 |
| Butyl Acetate | 8.44 |

The coating composition of Example 8 shown in Table 7 containing the optional acrylic polymer was made at the NCO/OH ratio of 1.03, with 200 ppm of dibutyl tin dilaurate based on binder solids. As shown in Table 8 below, the coating composition of Example 8 had the desired viscosity stability, fast BK surface dry time and gel fraction (90 to 94%) and good overall film properties:

TABLE 8

| Tests | Example 8 |
|---|---|
| Initial Zahn 2* | 18 |
| 1 hr Zahn 2 | 23 |
| BK3 Time** | 220 |
| % Gel Fraction | 92 |

*Viscosity using Zahn 2 cup in seconds; measured initially and after one hour
**Dry time in minutes

What is claimed is:

1. An ambient curable coating composition comprising a binder, which comprises:
   a hydroxyl component comprising a linear or branched cycloaliphatic moiety-containing reactive oligomer having a GPC weight average molecular weight not exceeding 3,000 and a polydispersity not exceeding about 1.7, said reactive oligomer having at least two hydroxyl groups, at least one of said hydroxyl groups on average being a primary hydroxyl group, said oligomer being produced by reacting an oligomeric acid with a monofunctional epoxy selected from the group consisting of ethylene oxide, butylene oxide, propylene oxide, and a combination thereof; and a crosslinking component comprising an oligomeric crosslinker provided with at least two isocyanate groups wherein the ratio of equivalents of isocyanate per equivalent of hydroxyl groups is in the range of from 0.5/1 to 3.0/1.

2. The composition of claim 1 wherein said hydroxyl component further comprises 0.1 weight percent to 95 weight percent based on the total weight of the hydroxyl component of an acrylic polymer, a polyester or a combination thereof.

3. The composition of claim 2 wherein said hydroxyl component further comprises up to 40 weight percent of a dispersed acrylic polymer, the percentage being based on the total weight of the binder.

4. The composition of claim 2 wherein said acrylic polymer has a GPC weight average molecular weight exceeding 3000.

5. The composition of claim 2 wherein said polyester has a GPC weight average molecular weight exceeding 1500.

6. The composition of claim 1 wherein said crosslinking component further comprises a non-isocyanate cross linker selected from the group consisting of an aldimine, ketimine, polyaspartic ester and a combination thereof.

7. The composition of claim 1 wherein said oligomeric acid is a reaction product of a multifunctional alcohol with a monomeric anhydride.

8. The composition of claim 1 wherein said oligomeric acid is a reaction product of a multifunctional alcohol with a less than stoichiometric amount of a monomeric anhydride to provide said oligomeric acid with at least one hydroxyl functionality.

9. The composition of claim 1 wherein said oligomeric acid and said monofunctional epoxy are reacted at a gage pressure in the range of from 0 to 14 kilograms per square centimeter.

10. The composition of claim 1 further comprising a catalyst selected from the group consisting of a tin compound, tertiary amine and a combination thereof.

11. The composition of claim 1 further comprising a phosphite compound.

12. The composition of claim 1 further comprising a pigment.

13. The ambient curable coating composition of claim 1 wherein a ratio of primary hydroxyl groups to secondary hydroxyl groups in said reactive oligomer is 90/10.

14. The ambient curable coating composition of claim 1 wherein a ratio of primary hydroxyl groups to secondary groups in said reactive oligomer is 25/75.

15. The composition of claim 1 wherein said oligomeric acid is a reaction product of a multifunctional alcohol with a monomeric anhydride, said multifunctional alcohol being selected from the group consisting of pentaerythritol and trimethylol propane.

16. The composition of claim 1 wherein said oligomeric acid is a reaction product of a multifunctional alcohol with a less than stoichiometric amount of a monomeric anhydride to provide said oligomeric acid with at least one hydroxyl functionality, said multifunctional alcohol being selected from the group consisting of pentaerythritol and trimethylol propane.

17. The ambient curable coating composition of claim 1 wherein said hydroxyl component further comprises 50 weight percent to 95 weight percent based on the total weight of the hydroxyl component of an acrylic polymer, a polyester or a combination thereof.

18. The ambient curable coating composition of claim 17 wherein said hydroxyl groups in said reactive oligomer are primary hydroxyl groups.

19. A process for producing a coating on the surface of a substrate, said process comprising:

mixing hydroxyl and crosslinking components of a binder of an ambient coating composition to form a potmix, wherein said hydroxyl component comprises a linear or branched cycloaliphatic moiety-containing reactive oligomer having a GPC weight average molecular weight not exceeding 3,000 and a polydispersity not exceeding about 1.7, said reactive oligomer having at least two hydroxyl groups, at least one of which on average being a primary hydroxyl group, said oligomer being produced by reacting an oligomeric acid with a monofunctional epoxy selected from the group consisting of ethylene oxide, butylene oxide, propylene oxide, and a combination thereof, and wherein said crosslinking component comprising an oligomeric crosslinker provided with at least two isocyanate groups wherein the ratio of equivalents of isocyanate per equivalent of hydroxyl groups is in the range of from 0.5/1 to 3.0/1;

applying a layer of said pot mix on said surface; and curing said layer under ambient conditions to form said coating on said surface of said substrate.

20. The process of claim 19 wherein said oligomeric acid is produced by reacting a multifunctional alcohol with a less than stoichiometric amount of a monomeric anhydride to provide said oligomeric acid with at least one hydroxyl functionality.

21. The process of claim 19 further comprising lowering an APHA color value of said coating composition in the range of from 0 to 80 by adding in the range of from 0.1 weight percent to 3 weight percent all based on the weight of reactive oligomer solids, of a phosphite compound.

22. The process of claim 19 wherein a ratio of primary hydroxyl groups to secondary hydroxyl groups in said reactive oligomer is 90/10.

23. The process of claim 19 wherein a ratio of primary hydroxyl groups to secondary hydroxyl groups in reactive oligomer is 25/75.

24. The process of claim 19 wherein said oligomeric acid is a reaction product of a multifunctional alcohol with a monomeric anhydride, said multifunctional alcohol being selected from the group consisting of pentaerythritol and trimethylol propane.

25. The process of claim 19 wherein said oligomeric acid is a reaction product of a multifunctional alcohol with a less than stoichiometric amount of a monomeric anhydride to provide said oligomeric acid with at least one hydroxyl functionality, said multifunctional alcohol being selected from the group consisting of pentaerythritol and trimethylol propane.

26. The process of claim 19 wherein said hydroxyl component further comprises 50 weight percent to 95 weight percent based on the total weight of the hydroxyl component of an acrylic polymer, a polyester or a combination thereof.

27. The process of claim 26 wherein said hydroxyl groups in said reactive oligomer are primary hydroxyl groups.

28. A substrate coated in accordance with the process of claim 19.

* * * * *